US012762542B2

(12) United States Patent
Park et al.

(10) Patent No.: US 12,762,542 B2
(45) Date of Patent: Oct. 13, 2026

(54) SYSTEM AND METHOD FOR GENERATING VIRTUAL ASSET WALLET ADDRESS BLACKLIST DATABASE BASED ON GRAPH ATTENTION NETWORK (GAT)

(71) Applicant: BONANZA FACTORY CO., LTD., Seoul (KR)

(72) Inventors: Hye Yeon Park, Seoul (KR); Han Joo Lee, Seoul (KR); Kyu Hwan Jung, Seoul (KR); Hyo Yeon Jeon, Seoul (KR); Yeon Cheol Choi, Seoul (KR)

(73) Assignee: BONANZA FACTORY CO., LTD., Seoul (KR)

( * ) Notice: Subject to any disclaimer, the term of this patent is extended or adjusted under 35 U.S.C. 154(b) by 0 days.

(21) Appl. No.: 19/034,598

(22) Filed: Jan. 23, 2025

(65) Prior Publication Data

US 2025/0165959 A1 May 22, 2025

Related U.S. Application Data

(63) Continuation of application No. PCT/KR2024/009804, filed on Jul. 9, 2024.

(30) Foreign Application Priority Data

Sep. 14, 2023 (KR) ........................ 10-2023-0122305

(51) Int. Cl.
*G06Q 20/36* (2012.01)
*G06N 3/04* (2023.01)
(Continued)

(52) U.S. Cl.
CPC ......... *G06Q 20/3674* (2013.01); *G06N 3/042* (2023.01); *G06Q 20/4016* (2013.01)

(58) Field of Classification Search
USPC ............................................................ 705/67
See application file for complete search history.

(56) References Cited

U.S. PATENT DOCUMENTS

2019/0172067 A1 6/2019 Arora et al.
2021/0174347 A1* 6/2021 Rose .................. H04L 63/0428
(Continued)

FOREIGN PATENT DOCUMENTS

JP 2021099809 A 7/2021
KR 102259838 B1 6/2021
(Continued)

OTHER PUBLICATIONS

Wahrstatter, A., et al., "Improving Cryptocurrency Crime Detection: CoinJoin Community Detection Approach", IEEE Transactions on Dependable and Secure Computing (vol. 20, Issue: 6, Nov.-Dec. 2023). (Year: 2023).*

*Primary Examiner* — Clay C Lee
(74) *Attorney, Agent, or Firm* — NKL Law; Jae Youn Kim

(57) ABSTRACT

A system and method for generating a virtual asset wallet address blacklist database based on a graph attention network (GAT) are disclosed. A GAT AI engine server is configured to train a GAT-based AI model using an index of a full node for each virtual asset pre-stored in an index database server, common transaction item information pre-stored in a virtual asset transaction analysis database server, and a main blacklist consisting of high-risk virtual asset wallet addresses pre-stored in a main blacklist server, to calculate GAT scores based on the trained AI model, to estimate high-risk virtual asset wallet addresses using the calculated GAT scores, and to generate a GAT blacklist consisting of the estimated high-risk virtual asset wallet addresses; and a GAT blacklist database server is configured
(Continued)

to store the GAT blacklists generated by the GAT AI engine server.

7 Claims, 6 Drawing Sheets

(51) Int. Cl.

| | |
|---|---|
| ***G06N 3/042*** | (2023.01) |
| ***G06Q 20/40*** | (2012.01) |

(56) References Cited

U.S. PATENT DOCUMENTS

| | | | | |
|---|---|---|---|---|
| 2022/0067738 | A1* | 3/2022 | Fang | G06Q 20/389 |
| 2022/0101326 | A1* | 3/2022 | Kim | G06Q 20/4016 |
| 2023/0126708 | A1* | 4/2023 | Wadhwa | G06N 20/20<br>705/44 |

FOREIGN PATENT DOCUMENTS

| | | | | |
|---|---|---|---|---|
| KR | 102440878 | B1 | 9/2022 | |
| KR | 102455870 | B1 | 10/2022 | |
| KR | 20230097395 | A | 7/2023 | |
| WO | WO-2021154391 | A1 * | 8/2021 | H04L 9/50 |

* cited by examiner

BTC E-WALLET ADDRESS : A

SUM OF A'S ENTIRE TRANSACTIONS BY CATEGORY

TOTAL AMOUNT SENT AND RECEIVED BY A

| addr | market | scam | threat | tumble | drug | sanction | hack | porn | gamble | other | bl_txs_num | bl_value | total_value | total_num |
|---|---|---|---|---|---|---|---|---|---|---|---|---|---|---|
| 1Glz6eA3NaZOB6kx[illegible]9vZ757TbDWKAPS2y9 | 0 | 21.1563 | 0 | 9.3971 | 0 | 0 | 10.12 | 0 | 0 | 0 | 5 | 40.6734 | 155248.7 | 87 |
| 1Lu6Cx2EWBoCvi3vbzCpE6imnCRDmjevqJ | 0 | 0 | 12.4 | 20.1531 | 0 | 0 | 0 | 0 | 0 | 0 | 3 | 32.5531 | 100 | 4 |
| 18JFQkzdicGUZXRPUy1kG6uTHyLmcS39e6 | 0 | 0 | 0 | 61.1284 | 0 | 0 | 0 | 0 | 0 | 0 | 2 | 61.1284 | 100 | 8 |
| 12RuxkTrRTUy2YtaYXuB6VzKkGL9DnznQ | 0 | 0 | 12.4 | 49.18 | 0 | 0 | 0 | 0 | 0 | 0 | 2 | 61.58 | 100 | 2 |

FIG. 5

SYSTEM AND METHOD FOR GENERATING VIRTUAL ASSET WALLET ADDRESS BLACKLIST DATABASE BASED ON GRAPH ATTENTION NETWORK (GAT)

TECHNICAL FIELD

The present disclosure relates to a system and method for generating a virtual asset wallet address blacklist database, and more specifically, to a system and method for generating a virtual asset wallet address blacklist database based on a graph attention network (GAT).

BACKGROUND ART

Due to their nature, blockchain-based virtual assets are difficult to trace and are often used for illegal financial transactions. If a virtual asset wallet itself is frequently used for very risky transactions, it is necessary to preemptively identify the virtual asset wallet and prevent any fraudulent use thereof.

However, since it is very easy to create a virtual asset wallet, and the procedures related to security or authentication are lax, anyone is able to create a virtual asset wallet at any time and use the wallet for fraudulent purposes.

Therefore, it is necessary to identify high-risk or harmful virtual asset wallets in advance and prevent such wallets from being used in illegal transactions or fraudulent use.

However, current virtual asset exchanges lack the means to prevent these illegal transactions or misuse.

In particular, there is no properly established standard for determining whether numerous virtual asset wallets pose a high or low risk of illegality. Therefore, an algorithm is needed to accurately estimate the potential illegality of virtual asset wallets.

DISCLOSURE

Technical Problem

One object of the present disclosure is to provide a system for generating a virtual asset wallet address blacklist database based on a graph attention network (GAT).

Another object of the present disclosure is to provide a method for generating a virtual asset wallet address blacklist database based on a GAT.

Technical Solution

A system for generating a virtual asset wallet address blacklist database based on a graph attention network (GAT) according to an aspect of the present disclosure includes: a GAT AI engine server configured to train a GAT-based AI model using an index of a full node for each virtual asset pre-stored in an index database server, common transaction item information pre-stored in a virtual asset transaction analysis database server, and a main blacklist consisting of high-risk virtual asset wallet addresses pre-stored in a main blacklist server, to calculate GAT scores based on the trained AI model, to estimate high-risk virtual asset wallet addresses using the calculated GAT scores, and to generate a GAT blacklist consisting of the estimated high-risk virtual asset wallet addresses; and a GAT blacklist database server configured to store the GAT blacklist generated by the GAT AI engine server.

Here, the GAT AI engine server may include: a first data preprocessing module configured to preprocess the common transaction item information stored in the virtual asset transaction analysis database server, to label each common transaction item information according to a type of coin, and to query any transaction corresponding to a predetermined virtual asset wallet address; an AI learning module configured to perform GAT learning using transactions queried by the first data preprocessing module; a teacher module configured to perform pseudo-labeling on unlabeled transactions from the first data preprocessing module, and feed the pseudo-labeled transactions to the AI learning module to re-learn the pseudo-labeled transactions; and a first risk calculation module configured to calculate a risk level corresponding to a GAT score of each virtual asset wallet address based on results of the GAT learning performed by the AI learning module.

In addition, the system may further include: a high-risk wallet address service server configured to receive a virtual asset wallet address from a virtual asset exchange server, to calculate a risk level for the received virtual asset wallet address, and to respond to the virtual asset exchange server with the calculated risk level.

Further, the high-risk wallet address service server may include: a second data preprocessing module configured to receive a virtual asset wallet address from the virtual asset exchange server and perform preprocessing; a transaction inquiry module configured to query transactions of the virtual asset wallet address, which has undergone preprocessing by the second data preprocessing module 331, from the virtual asset transaction analysis database server; a second risk calculation module configured to calculate a risk level corresponding to a GAT score of the virtual asset wallet address using the transactions queried by the transaction query module; and a learning update module configured to request the AI learning module to train an artificial intelligence model based on the risk level calculated by the second risk calculation module.

Further, the system may further include a high-risk wallet address management server configured to receive a virtual asset wallet address from an administrator terminal, to calculate a risk level for the received virtual asset wallet address, and to respond to the administrator terminal with the calculated risk level.

A method for generating a virtual asset wallet address blacklist database based on a graph attention network (GAT) according to another aspect of the present disclosure includes: training, by a GAT AI engine server, a GAT-based AI model using an index of a full node for each virtual asset pre-stored in an index database server, common transaction item information pre-stored in a virtual asset transaction analysis database server, and a main blacklist consisting of high-risk virtual asset wallet addresses pre-stored in a main blacklist server; calculating GAT scores based on the trained AI model by the GAT AI engine server; estimating high-risk virtual asset wallet addresses using the calculated GAT scores and generating a GAT blacklist consisting of the estimated high-risk virtual asset wallet addresses by the GAT AI engine server; and storing, by a GAT blacklist database server, the GAT blacklists generated by the GAT AI engine server.

Here, the method may further include receiving a virtual asset wallet address from a virtual asset exchange server, calculating a risk level for the received virtual asset wallet address, and responding to the virtual asset exchange server with the calculated risk level by a high-risk wallet address service server.

Further, the method may further include receiving a virtual asset wallet address from an administrator terminal, calculating a risk level for the received virtual asset wallet address, and responding to the administrator terminal with the calculated risk level by a high-risk wallet address management server.

Advantageous Effects

According to the above-described system and method for generating a virtual asset wallet address blacklist database based on a graph attention network (GAT), it is configured to collect a full node and corresponding transaction data for each virtual asset network, and to perform GAT learning based on a database generated by automatically extracting training data to proactively detect a full node with a high potential for fraudulent use, etc., from the collected full node and transaction data, and a database built by generating a blacklist and whitelist for each virtual asset wallet address, and this allows for more accurate estimation and monitoring of a probability of illegal use or fraudulent transactions regarding all virtual asset wallet addresses.

DESCRIPTION OF DRAWINGS

FIG. 5 is an example of risk calculation data according to an embodiment of the present disclosure.

BEST MODE FOR CARRYING OUT THE INVENTION

Figure 1:
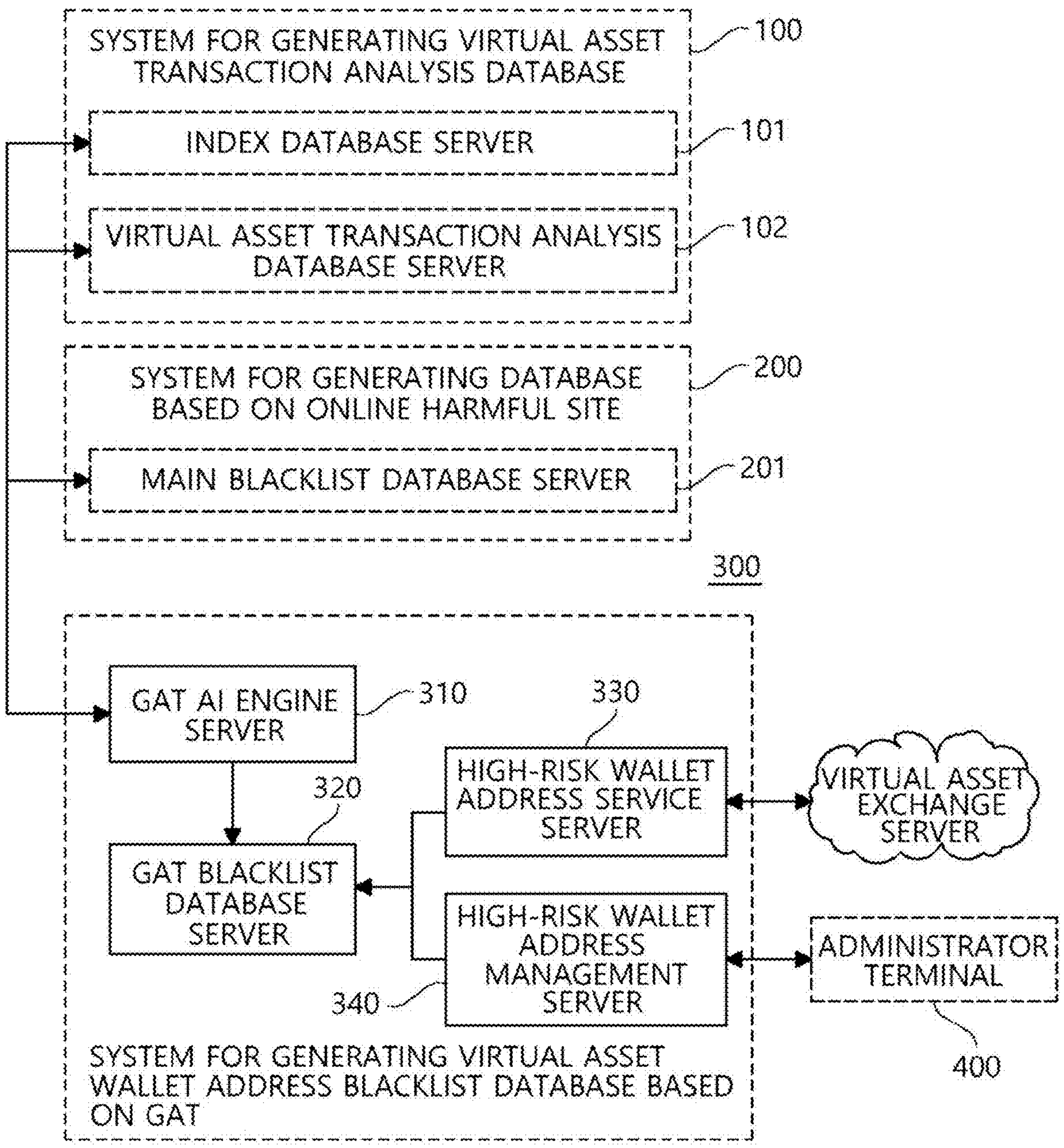
FIG. 1 is a block diagram of a system for generating a virtual asset wallet address blacklist database based on a graph attention network (GAT) according to an embodiment of the present disclosure.

Various modifications may be made to exemplary embodiments of the present disclosure, and specific exemplary embodiments will be described below in detail with reference to attached drawings. However, it should be understood that the present disclosure is not to be limited to the specific embodiments, but includes all modifications, equivalents, and alternatives falling within the spirit and scope of the disclosure. The like reference numerals are used for similar components in describing each of the drawings.

It will be understood that, although the terms "first", "second", "A", "B", and the like may be used herein in explaining various components of the present disclosure, such components should not be limited by these terms. The above terms are only used to distinguish one component from another. For example, without departing from the scope of the present disclosure, a first component may be referred to as a second component, and similarly, the second component may also be referred to as the first component. The expression "and/or" encompasses any one of a combination of a plurality of associated items as described, and a plurality of associate items as described.

When a component is referred to as being "connected" or "accessed" to other component, it should be understood that not only is the component directly connected or accessed to the other component, but also, another component may exist therebetween. On the other hand, when a component is referred to as being "directly connected" or "directly accessed" to other component, it should be understood that there is no component therebetween.

The terms used in this application are only used to describe specific embodiments and are not intended to limit the present disclosure. The singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, preferred embodiments according to the present disclosure will be described in detail with reference to the attached drawings.

Figure 2:
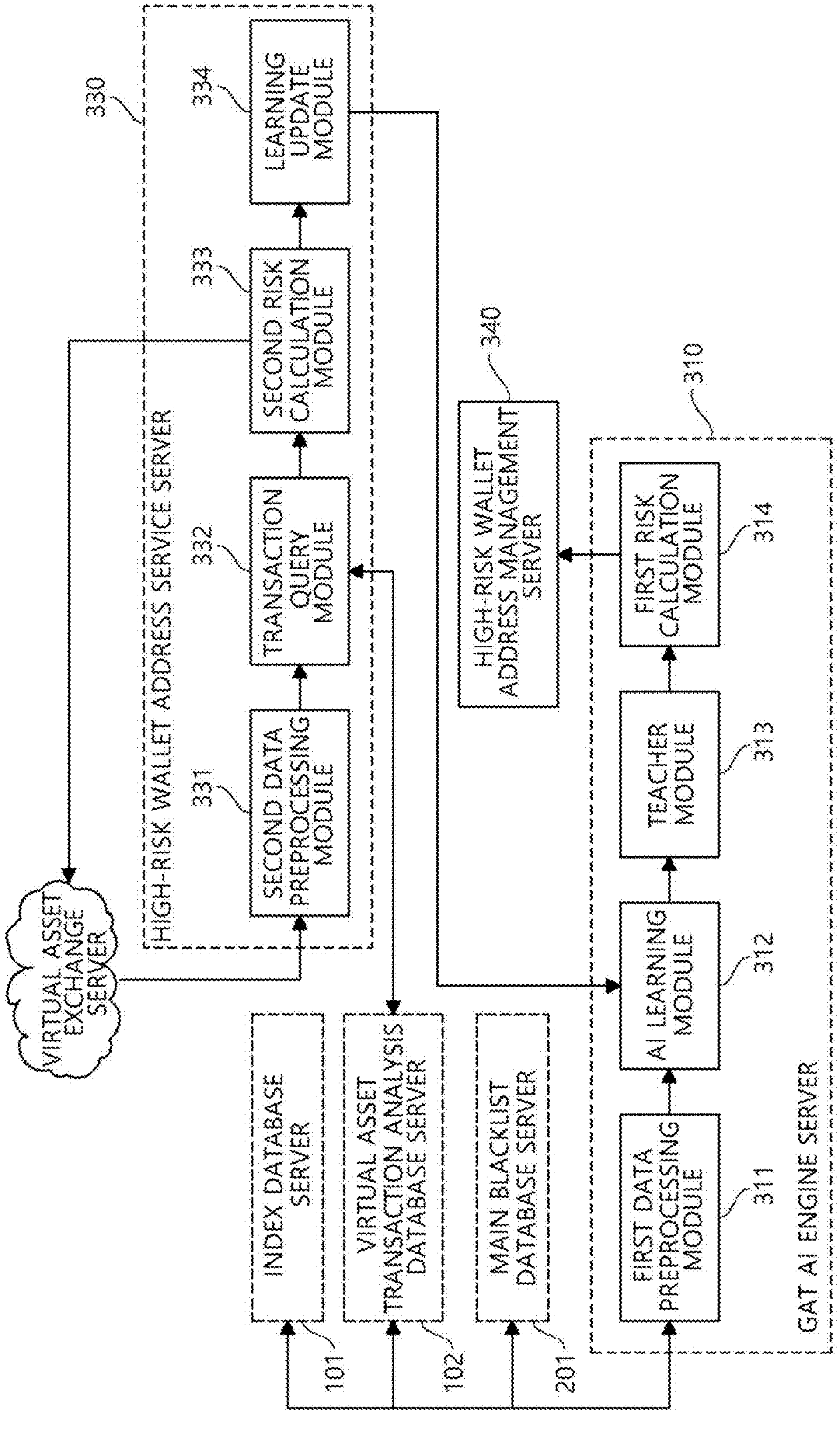
FIG. 2 is a detailed configuration diagram of a system for generating a virtual asset wallet address blacklist database based on a GAT according to an embodiment of the present disclosure.

FIG. 1 is a block diagram of a system for generating a virtual asset wallet address blacklist database based on a graph attention network (GAT) according to an embodiment of the present disclosure, and FIG. 2 is a diagram illustrating the detailed configuration of a system for generating a virtual asset wallet address blacklist database based on a GAT according to an embodiment of the present disclosure.

Referring to FIGS. 1 and 2, a system 300 for generating a virtual asset wallet address blacklist database based on a GA may include a GAT AI engine server 310, a GAT blacklist database server 320, a high-risk wallet address service server 330, and a high-risk wallet address management server 340.

Hereinafter, the detailed configuration will be described.

The GAT AI engine server 310 may be configured to train a GAT-based artificial intelligence model using an index of a full node for each virtual asset pre-stored in an index database server 101, common transaction item information pre-stored in a virtual asset transaction analysis database server 102, and a main blacklist comprising high-risk virtual asset wallet addresses pre-stored in a main blacklist server 201.

Here, the index database server 101 is configured to store the index of the full node for each virtual asset, and the index may be generated in advance by sequentially indexing each virtual asset wallet address. In addition, the common transaction item information may be a sender's wallet address, a recipient's wallet address, a virtual asset transfer amount, a transfer fee, a transaction time, a transaction hash, a previous transaction output, and signatures for all transactions.

In addition, the GAT AI engine server 310 may be configured to calculate GAT scores based on the artificial intelligence model trained as above, estimate high-risk virtual asset wallet addresses using the calculated GAT scores, and generate a GAT blacklist consisting of the estimated high-risk virtual asset wallet addresses.

The GAT AI engine server 310 may be configured to include a first data preprocessing module 311, an AI learning module 312, a teacher module 313, and a first risk calculation module 314.

Hereinafter, the detailed configuration will be described.

The first data preprocessing module 311 may be configured to preprocess the common transaction item information stored in the virtual asset transaction analysis database server 102, label each common transaction item information according to a type of coin, and query any transaction corresponding to a predetermined virtual asset wallet address.

The AI learning module 312 may be configured to perform GAT learning using the transaction queried by the first data preprocessing module 311.

At this point, the AI learning module 312 may execute a GAT learning model through the following processes to generate a GAT blacklist.

First, the AI learning module 312 may extract a GAT graph structure for all transactions based on the GAT using the index of the full node for each virtual asset pre-stored in the index database server 101 and the common transaction item information pre-stored in the virtual asset transaction analysis database server 102. In addition, an adjacency matrix corresponding to connections within the GAT graph structure as edges may be generated.

Then, the AI learning module 312 may generate a feature matrix by assigning a preset weight to each online source site during crawl collection for data matrixed by risk category, using a main blacklist consisting of high-risk virtual asset wallet addresses pre-stored in the main blacklist server 201.

The AI learning module 312 may pass the feature matrix and adjacency matrix, which constitute the nodes and edges of the GAT graph structure, through an attention layer to generate a pre-trained model for the labeled training data of high-risk virtual asset wallet addresses. Using this pre-trained model, the AI learning module 312 may predict unlabeled data for high-risk virtual asset wallet addresses and perform a main learning model which is based on semi-supervised learning, and in which a prediction result is used as a GAT score to estimate a high-risk virtual asset wallet address.

At this point, the AI learning module 312 may be configured to automatically generate and update a GAT blacklist database, which contains GAT scores for estimating high-risk virtual asset wallet addresses, by repeatedly executing the main learning model.

Meanwhile, the AI learning module 312 may be configured to generate a feature matrix with category classification values of high-risk virtual asset wallet addresses or transactions, by mapping all transactions to nodes in the graph structure for a BTC network and by mapping all wallet addresses to nodes in a graph structure for an ETH network.

Furthermore, the AI learning module 312 may be configured to generate an adjacency matrix by mapping the connections between transactions as edges for the BTC network and by mapping the connections between wallet addresses as edges for the ETH network.

On the other hand, a process of generating a GAT blacklist proceeds as follows.

First, an arbitrary virtual asset wallet address is entered. Then, all transactions adjacent to the arbitrary virtual asset wallet address are queried. Next, a risk category classified for each transaction and an estimated probability value for each transaction to be a high-risk virtual asset wallet address are queried. The risk category classified for each transaction and the estimated probability value for each transaction to be a high-risk virtual asset wallet address are then combined to calculate an overall risk level for the arbitrary virtual asset wallet address.

Here, the process of querying the probability value includes the steps of: querying all transactions related to the arbitrary virtual asset wallet address from the GAT blacklist database; predicting unlabeled data for high-risk virtual asset wallet addresses by utilizing transaction data labeled with GAT scores, which are used to estimate high-risk virtual asset wallet addresses among all the transactions, and using the prediction results as risk probability values to estimate the high-risk virtual asset wallet addresses; and storing a risk category classified for each transaction and an estimated probability value for each transaction to be a high-risk virtual asset wallet address.

The teacher module 313 may be configured to perform pseudo-labeling on the unlabeled transactions from the first data preprocessing module 311, and feed the pseudo-labeled transactions to the AI learning module to re-learn the transactions.

The first risk calculation module 314 may be configured to calculate a risk level corresponding to a GAT score of each virtual asset wallet address based on a result of the GAT learning performed by the AI learning module 312.

The GAT blacklist database server 320 may be configured to store the GAT blacklist generated by the GAT AI engine server 310.

The high-risk wallet address service server 330 may be configured to receive a virtual asset wallet address from a virtual asset exchange server, calculate a risk level for the received virtual asset wallet address, and respond to the virtual asset exchange server with the calculated risk level.

The high-risk wallet address service server 330 may be configured to include a second data preprocessing module 331, a transaction query module 332, a second risk calculation module 333, and a learning update module 334.

Hereinafter, the detailed configuration will be described.

The second data preprocessing module 331 may be configured to receive a virtual asset wallet address from the virtual asset exchange server and perform preprocessing.

The transaction query module 332 may be configured to query transactions of the virtual asset wallet address, which has undergone preprocessing by the second data preprocessing module 331, from the virtual asset transaction analysis database server 102.

The second risk calculation module 333 may be configured to calculate a risk level corresponding to a GAT score of the virtual asset wallet address using the transactions queried by the transaction query module 332.

The training update module 334 may be configured to request the AI learning module 312 to train an artificial intelligence model based on the risk level calculated by the second risk calculation module 333.

The high-risk wallet address management server 340 may be configured to receive a virtual asset wallet address from an administrator terminal 400, calculate a risk level for the received virtual asset wallet address, and respond to the administrator terminal 400 with the calculated risk level.

Figure 3:
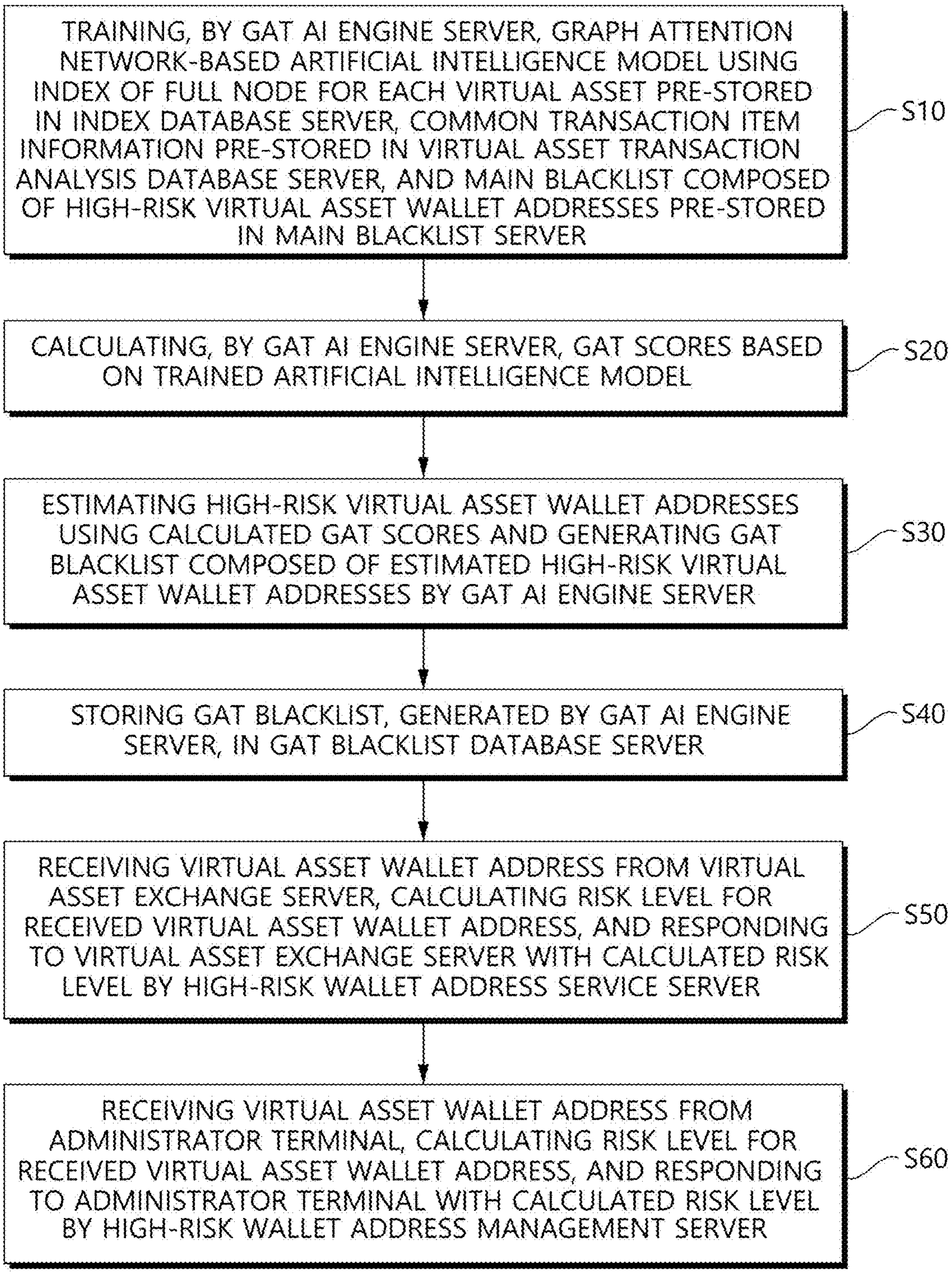
FIG. 3 is a flowchart of a method for generating a virtual asset wallet address blacklist database based on a GAT according to an embodiment of the present disclosure.

FIG. 3 is a flowchart of a method for generating a virtual asset wallet address blacklist database based on a GAT according to an embodiment of the present disclosure.

Referring to FIG. 3, a GAT AI engine server 310 trains a GAT-based artificial intelligence model using an index of a full node for each virtual asset pre-stored in an index database server 101, common transaction item information pre-stored in a virtual asset transaction analysis database server 102, and a main blacklist consisting of high-risk virtual asset wallet addresses pre-stored in a main blacklist server 201 (S10).

Next, the GAT AI engine server 310 calculates GAT scores based on the trained artificial intelligence model (S20).

Next, the GAT AI engine server 310 estimates high-risk virtual asset wallet addresses using the calculated GAT scores and generates a GAT blacklist consisting of the estimated high-risk virtual asset wallet addresses (S30).

Next, the GAT blacklist generated by the GAT AI engine server 310 is stored in a GAT blacklist database server 320 (S40).

Next, a high-risk wallet address service server 330 receives a virtual asset wallet address from a virtual asset exchange server, calculates a risk level for the received virtual asset wallet address, and responds to the virtual asset exchange server with the calculated risk level (S50).

Next, a high-risk wallet address management server 340 receives a virtual asset wallet address from an administrator terminal 400, calculates a risk level for the received virtual asset wallet address, and responds to the administrator terminal 400 with the calculated risk level (S60).

Figure 4:
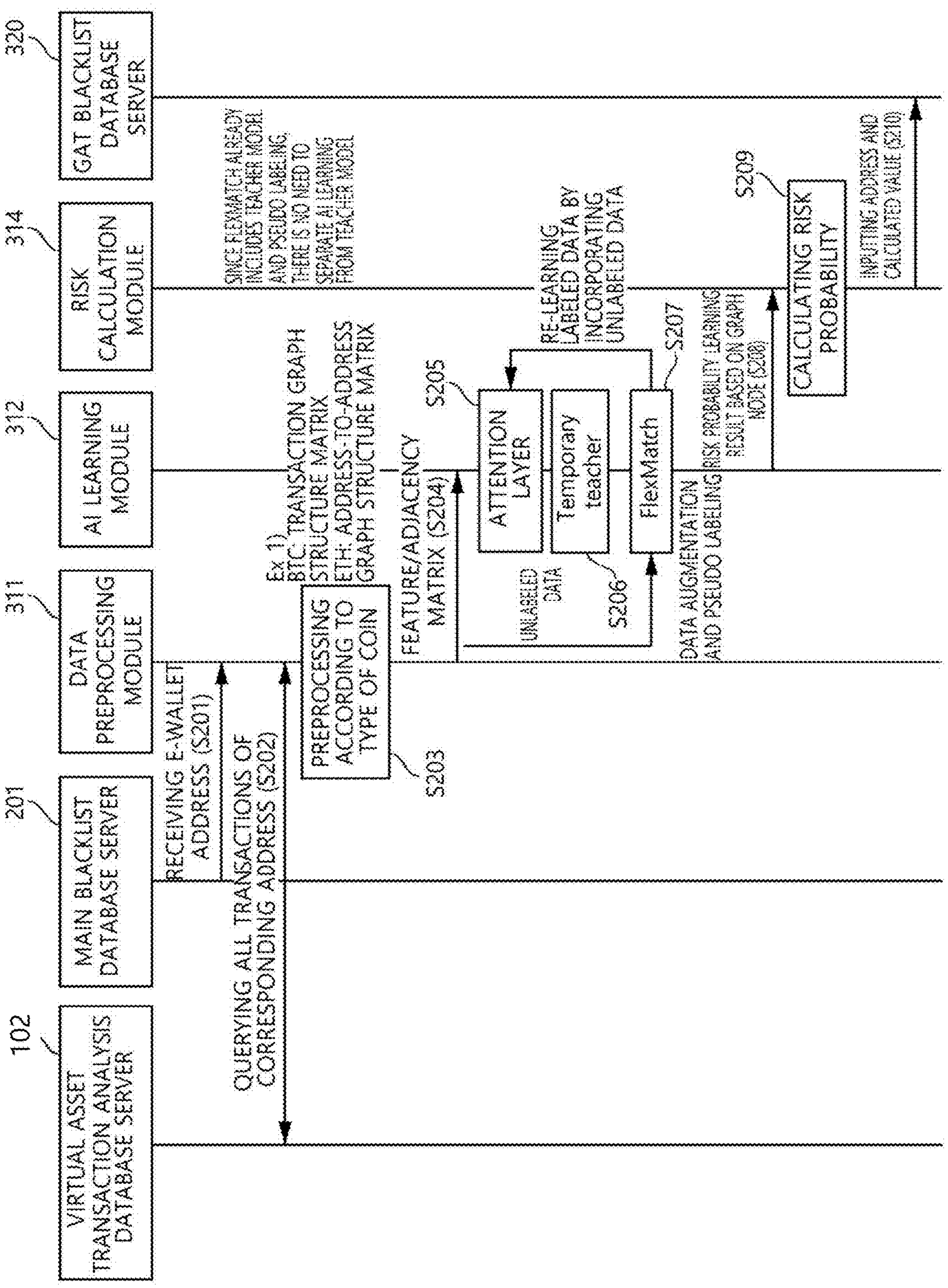
FIGS. 4 and 6 are detailed flowcharts of a method for generating a virtual asset wallet address blacklist database based on a GAT according to an embodiment of the present disclosure.
Figure 6:
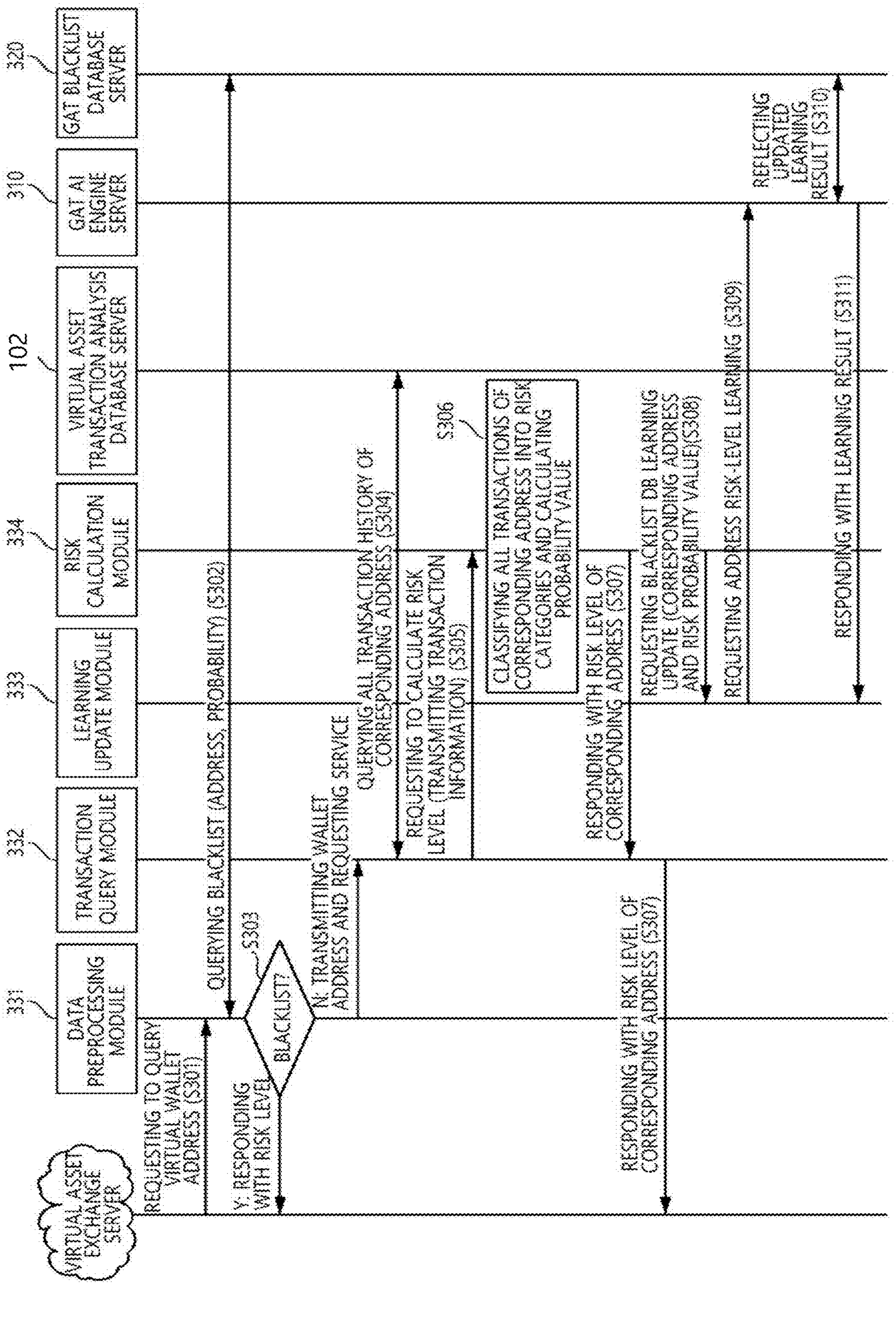

FIGS. 4 and 6 are detailed flowcharts of a method for generating a virtual asset wallet address blacklist database based on a GAT according to an embodiment of the present disclosure, and FIG. 5 illustrates an example of risk level calculation data according to an embodiment of the present disclosure.

Here, FIG. 4 relates to a detailed sequence of generating a GAT-based learning model, where all transactions for a predetermined wallet address are queried and learning is performed based on a GAT algorithm. At this point, even for data that is not labeled during a data preprocessing process, the accuracy of the data is improved through re-learning by the teacher module 313. Also, by calculating a risk level corresponding to a GAT score, a GAT-based blacklist may be generated. Furthermore, a process of immediately accepting unlabeled data through a temporary teacher and performing immediate relearning is exemplified.

FIG. 5 illustrates the result of searching for transactions of a specific BTC wallet address A, calculating a sum of A's transactions by category, and monitoring a total amount sent and received by A.

For example, the total amount sent and received in the "Threat" category for A is 12.4, and the total amount sent and received in the "Tumble" category is 20.1531. The total amount sent and received in all categories for A is 100.

Here, the risk level of A is calculated by dividing a maximum value of the amount sent and received by category by the total amount sent and received by A. Here, A's risk is calculated by dividing the maximum transmission and reception volume for each category by A's total transmission and reception volume. That is, a risk level of A's Tumble category is 20.1531/100, which is 20.1531%.

FIG. 6 illustrates a process of calculating and responding with a risk level of a virtual asset wallet address requested by a virtual asset exchange server. At this point, a result of risk level calculation is updated in a GAT blacklist database server 320 to build a database.

As described above, the present disclosure is configured to collect a full node and corresponding transaction data for each virtual asset network, and to perform GAT learning based on a database generated by automatically extracting training data to proactively detect a full node with a high potential for fraudulent use, etc., from the collected full node and transaction data, and a database built by generating a blacklist and whitelist for each virtual asset wallet address, and this allows for more accurate estimation and monitoring of a probability of illegal use or fraudulent transactions regarding all virtual asset wallet addresses.

Although the description has been made with reference to the above examples, those skilled in the art can understand that various modifications and changes can be made to the present disclosure without departing from the spirit and scope of the present disclosure as set forth in the claims below.

The invention claimed is:

1. A system for generating a virtual asset wallet address blacklist database for virtual asset wallet addresses based on a graph attention network (GAT), wherein the blacklist database is utilized for a virtual asset transaction executed on a blockchain network through a transfer between a wallet address of a sender and a wallet address of a recipient among the virtual asset wallet addresses such that a virtual asset transfer amount is transferred from the wallet address of the sender to the wallet address of the recipient, and a transaction time and a virtual asset transaction detail including a transaction hash are recorded on the blockchain network, the system comprising:

a GAT artificial intelligence (AI) engine server configured to train a GAT-based AI model using an index of a full node for each virtual asset pre-stored in an index database server, common transaction item information pre-stored in a virtual asset transaction analysis database server, and a main blacklist including high-risk virtual asset wallet addresses pre-stored in a main blacklist server, to calculate GAT scores based on the trained GAT-based AI model, to estimate the high-risk virtual asset wallet addresses using the calculated GAT scores, and to generate a GAT blacklist database including the estimated high-risk virtual asset wallet addresses; and a GAT blacklist database server configured to store the GAT blacklist database generated by the GAT AI engine server, wherein the index is generated by sequentially indexing the virtual asset wallet addresses, wherein the common transaction item information includes at least one of the wallet address of the sender, the wallet address of the recipient, the virtual asset transfer amount, the transaction time, the transaction hash, a previous transaction output, signatures for the virtual asset transaction, or any combination thereof, wherein the GAT AI engine server includes:

a first data preprocessing module configured to preprocess the common transaction item information, label each of transactions based on the preprocessed common transaction item information according to each virtual asset, and query the transactions corresponding to a predetermined virtual asset wallet address;

an AI learning module configured to perform GAT learning using the transactions queried by the first data preprocessing module;

a teacher module configured to pseudo-label transactions that are unlabeled by the first data preprocessing module, and feed the pseudo-labeled transactions to the AI learning module to re-learn the pseudo-labeled transactions by data augmentation; and a first risk calculation module configured to calculate a risk level representing the GAT scores of virtual asset wallet addresses based on results of the GAT learning performed by the AI learning module, wherein the AI learning module extracts a GAT graph structure for the transactions based on the GAT using the index of the full node for each virtual asset and the common transaction item information, wherein the AI learning module generates a feature matrix by assigning a weight to each online source site during crawl collection for data matrixed by risk category using the main blacklist, wherein the AI learning module passes the feature matrix and an adjacency matrix through an attention layer to define nodes and edges of the GAT graph structure, such that a pre-trained model for labeled training data associated with the high-risk virtual asset wallet addresses is generated, wherein the AI learning module, using the GAT graph structure, predicts unlabeled data for the high-risk virtual asset wallet addresses and performs the GAT learning based on semi-supervised learning, such that the GAT scores of the virtual asset wallet addresses are generated, wherein the AI learning module automatically generates and updates the GAT blacklist database by repeatedly executing the GAT graph structure, the GAT blacklist database including the GAT scores, and wherein the GAT AI engine server is further configured to:

receive data of an arbitrary virtual asset wallet address;

obtain transaction data related to the arbitrary virtual asset wallet address;

obtain a classified risk category for each transaction;

generate an estimated probability value for each transaction based on prediction results generated by the GAT-based AI model;

determine an overall risk level for the arbitrary virtual asset wallet address by combining the classified risk category and the estimated probability value for each transaction; and generate the GAT blacklist database based on the overall risk level.

2. The system of claim 1, further comprising a high-risk wallet address service server configured to receive a virtual asset wallet address from a virtual asset exchange server, to calculate the risk level for the received virtual asset wallet address, and to respond to the virtual asset exchange server with the calculated risk level.

3. The system of claim 2, wherein the high-risk wallet address service server comprises:

a second data preprocessing module configured to receive a virtual asset wallet address from the virtual asset exchange server and perform preprocessing;

a transaction query module configured to query transactions of the virtual asset wallet address, which has undergone preprocessing by the second data preprocessing module, from the virtual asset transaction analysis database server;

a second risk calculation module configured to calculate the risk level based on the GAT score using the transactions queried by the transaction query module; and a learning update module configured to request the AI learning module to train an artificial intelligence model based on the risk level calculated by the second risk calculation module.

4. The system of claim 3, further comprising a high-risk wallet address management server configured to receive a virtual asset wallet address from an administrator terminal, to calculate the risk level for the received virtual asset wallet address, and to respond to the administrator terminal with the calculated risk level.

5. A computer-implemented method for generating a virtual asset wallet address blacklist database for virtual asset wallet addresses based on a graph attention network (GAT), wherein the blacklist database is utilized for a virtual asset transaction executed on a blockchain network through a transfer between a wallet address of a sender and a wallet address of a recipient among the virtual asset wallet addresses such that a virtual asset transfer amount is transferred from the wallet address of the sender to the wallet address of the recipient, and a transaction time and a virtual asset transaction detail including a transaction hash are recorded on the blockchain network, the method comprising:

training, using a GAT artificial intelligence (AI) engine server, a GAT-based AI model using an index of a full node for each virtual asset pre-stored in an index database server, common transaction item information pre-stored in a virtual asset transaction analysis database server, and a main blacklist including high-risk virtual asset wallet addresses pre-stored in a main blacklist server, wherein the index is generated by sequentially indexing the virtual asset wallet addresses, and the common transaction item information includes at least one of the wallet addresses of the sender, the wallet address of the recipient, the virtual asset transfer amount, the transaction time, the transaction hash, a previous transaction output, signatures for the virtual asset transaction, or any combination thereof;

calculating GAT scores based on the trained GAT-based AI model using the GAT AI engine server;

estimating the high-risk virtual asset wallet addresses using the calculated GAT scores and generating a GAT blacklist including the estimated high-risk virtual asset wallet addresses using the GAT AI engine server; and storing, using a GAT blacklist database server, the GAT blacklist generated by the GAT AI engine server, wherein the training of the GAT-based AI model includes:

preprocessing the common transaction item information, labeling each of transactions according to each virtual asset based on the preprocessed common transaction item information, and querying the transactions corresponding to a predetermined virtual asset wallet address;

performing GAT learning based on the transactions queried by the first data preprocessing module using an AI learning module;

pseudo-labeling unlabeled transactions, and feeding the pseudo-labeled transactions to the AI learning module to re-learn the pseudo-labeled transactions by data augmentation; and calculating a risk level representing the GAT scores of virtual asset wallet addresses based on results of the GAT learning performed by the AI learning module;

wherein the performing of the GAT learning using the AI learning module includes:

extracting a GAT graph structure for the transactions based on the GAT using the index of the full node for each virtual asset and the common transaction item information;

generating a feature matrix by assigning a weight to each online source site during crawl collection for data matrixed by risk category using the main blacklist;

passing the feature matrix and an adjacency matrix through an attention layer to define nodes and edges of the GAT graph structure, such that a pre-trained model for labeled training data associated with the high-risk virtual asset wallet addresses is generated;

predicting unlabeled data for the high-risk virtual asset wallet addresses and performs the GAT learning based on semi-supervised learning, such that the GAT scores of the virtual asset wallet addresses are generated; and automatically generating and updating the GAT blacklist database by repeatedly executing the GAT graph structure, the GAT blacklist database including the GAT scores, wherein the generating of the GAT blacklist database using the GAT AI engine server includes:

receiving data of an arbitrary virtual asset wallet address;

obtaining transaction data related to the arbitrary virtual asset wallet address;

obtaining a classified risk category for each transaction;

generating an estimated probability value for each transaction based on prediction results generated by the GAT-based AI model;

determining an overall risk level for the arbitrary virtual asset wallet address by combining the classified risk category and the estimated probability value for each transaction; and generating the GAT blacklist database based on the overall risk level.

6. The method of claim 5, further comprising receiving a virtual asset wallet address from a virtual asset exchange server, calculating the risk level for the received virtual asset wallet address, and responding to the virtual asset exchange server with the calculated risk level by a high-risk wallet address service server.

7. The method of claim 6, further comprising receiving a virtual asset wallet address from an administrator terminal, calculating the risk level for the received virtual asset wallet address, and responding to the administrator terminal with the calculated risk level by a high-risk wallet address management server.

* * * * *